(12) United States Patent
Konno et al.

(10) Patent No.: US 6,661,550 B2
(45) Date of Patent: Dec. 9, 2003

(54) METHOD OF FIXING POLYGON MIRROR AND POLYGON SCANNER MOTOR

(75) Inventors: Katsushige Konno, Chiba (JP); Kaoru Kaneko, Chiba (JP); Tetsuo Yamamoto, Chiba (JP)

(73) Assignee: Seiko Instruments Inc., Chiba (JP)

( * ) Notice: Subject to any disclaimer, the term of this patent is extended or adjusted under 35 U.S.C. 154(b) by 0 days.

(21) Appl. No.: 09/838,891

(22) Filed: Apr. 20, 2001

(65) Prior Publication Data

US 2001/0036001 A1 Nov. 1, 2001

(30) Foreign Application Priority Data

Apr. 21, 2000 (JP) .......................... 2000-120890

(51) Int. Cl.[7] .............................................. G02B 26/08
(52) U.S. Cl. ....................................... 359/200; 359/216
(58) Field of Search ................................ 359/198, 200, 359/212, 216, 217, 218, 219, 871; 310/90, 90.5, 91, 67 R

(56) References Cited

U.S. PATENT DOCUMENTS 5,528,092 A * 6/1996 Ohta .......................... 310/67 R
5,883,455 A * 3/1999 Fukasawa et al. ............ 310/91

FOREIGN PATENT DOCUMENTS

| JP | 09021974 | 1/1997 |
| JP | 09230268 | 9/1997 |

* cited by examiner

Primary Examiner—Mark A. Robinson
(74) Attorney, Agent, or Firm—Adams & White

(57) ABSTRACT

A polygon scanner motor has a polygon mirror having an outer periphery, a mirror surface for scanning light arranged around the outer periphery, and a setting hole having an inner periphery. A rotor has a projection having a plastically deformable edge portion. The polygon mirror is positioned relative to the rotor so that the edge portion of the projection is disposed opposite a surface portion of the inner periphery of the setting hole proximate a center of the inner periphery in the axial direction thereof. The edge portion of the projection is plastically deformed against the surface portion of the inner periphery of the setting hole to thereby connect the polygon mirror to the rotor.

14 Claims, 5 Drawing Sheets

METHOD OF FIXING POLYGON MIRROR AND POLYGON SCANNER MOTOR

BACKGROUND OF THE INVENTION

1. Field of the Invention

The present invention relates to a method of fixing a polygon mirror used for scanning laser beam in a laser beam printer or a digital copier to a side of a rotating member of a motor and a polygon scanner motor using the fixing method.

2. Description of the Related Art

In an optical system such as a laser beam printer or a digital copier, there is used a polygon scanner motor as means for scanning laser beam. A polygon scanner motor of this kind is constituted by fixing a polygon mirror which is formed as a polygonal member in a shape of a thin plate comprising a material of, for example, aluminum and a side face of which is formed by a light reflecting face having mirror face accuracy of submicron order, to a rotor of a motor and is constituted to scan laser beam by making laser beam impinge to the light reflecting face of the side face of the polygon mirror in a state in which the motor is rotated at high speed.

Therefore, according to the conventional polygon scanner motor of this kind, it is necessary to firmly fix the polygon mirror to a rotor rotatably provided to a shaft of a stator via a bearing. Therefore, conventionally, as a method of fixing the polygon mirror, there are used a method of fixing thereof by an adhering agent, a method of fixing thereof by bringing the polygon mirror into press contact with the rotor by a clamp spring and a method of fixing the polygon mirror by plastically deforming portions of the rotor to thereby fixedly calk to the polygon mirror.

Among the conventional methods, the method of fixing the polygon mirror by an adhering agent, poses a problem that time is taken for curing the adhering agent, a long period of time is taken for reaching predetermined fixing strength and accordingly, assembly cost is increased. Meanwhile, the method of fixing the polygon mirror by using the clamp spring poses a problem that the number of parts is increased and accordingly, the costs are ncreased, further, when the polygon mirror is used at high speed rotation of, for example, 50,000 rpm or more, press force by the clamp spring must be increased considerably and there is produced a deformation causing a drawback in scanning light to the reflecting face of the polygon mirror.

Further, when a flange member of a rotating member is fitted to an attaching hole of a polygon mirror, an outer peripheral edge of the flange member is plastically deformed outwardly to be brought into press contact with an inner peripheral edge of the attaching hole of the polygon mirror to thereby achieve bonding of the rotating member and the polygon mirror as is disclosed in, for example, Japanese Patent Laid-Open No. 230268/1997, there poses a problem that there is operated force in a direction of bringing the polygon mirror into press contact with the rotor by calking, thereby, attitude of the polygon mirror is deviated from required attitude relative to the rotor, rotational balance is deteriorated and emittance of noise is caused.

Further, according to such a calking method, large calking force is needed for fixing the polygon mirror, there is operated force directed in a direction inclined to the polygon mirror at the peripheral edge portion of the attaching hole of the polygon mirror. Accordingly, strain is caused at the light reflecting face formed at the side face of the polygon mirror with great accuracy, its flatness is deteriorated and scanning of laser bream cannot be accomplished with great accuracy. As a result, there poses other problem that quality of scanning is deteriorated.

SUMMARY OF THE INVENTION

It is an object of the invention to provide a method of fixing a polygon mirror and a polygon scanner motor capable of resolving the above-described problem in the conventional technology.

In order to resolve the above-described problem according to an aspect of the invention, there is provided a method of fixing a polygon mirror which is a method of fixing the polygon mirror by fitting an attaching hole of the polygon mirror having a reflecting face for scanning light at a side face thereof to a projected portion provided at a rotor of a motor wherein a fitting face end edge of the projected portion is arranged to be opposed to a vicinity of a center in an axial direction of an inner peripheral face of the attaching hole and a portion of the fitting face end edge is subjected to plastic deformation in an outer direction to thereby fix the polygon mirror to the rotor.

The fitting face end edge can be an outer peripheral end edge of a stepped recess portion in a ring-like shape formed at an outer peripheral face of the projected portion.

The polygon mirror and the rotor enable to bond by producing the plastic deformation simultaneously at a plurality of locations at equal angular intervals along the fitting face end edge.

A recess is provided previously at the location of producing the plastic deformation and the plastic deformation enables to produce by bringing a calking jig in press contact with inside of the recess. Further, the portion of producing the plastic deformation is made to be able to correspond to an angle portion of the side face of the polygon mirror.

Further, the polygon mirror and the rotor are constituted by metal materials having linear expansion coefficients substantially equal to each other to thereby enable to prevent a state of bonding the polygon mirror and the rotor from being changed by a change in temperature. The polygon mirror and the rotor can be constituted by the same metal material.

According to another aspect of the invention, there is provided a polygon scanner motor which is a polygon scanner motor constituted by fitting and fixing an attaching hole of a polygon mirror formed with reflecting faces for scanning light at side faces thereof to a projected portion provided at a rotor of a motor wherein the projected portion includes a fitting face end edge opposed to a vicinity of a center in an axial direction of an inner peripheral face of the attaching hole of the polygon mirror and the projected portion is formed with plastically deformed portions bonded with the polygon mirror by pressing the inner peripheral face of the attaching hole to an outer side thereof in a diameter direction at a plurality of locations along the fitting face end edge.

Portions of forming the plastically deformed portions can be provided at equal angular intervals along a peripheral direction of the projected portion.

The fitting face end edge is made to enable to be opposed to the vicinity of the center in the axial direction of the inner peripheral face of the attaching hole by providing a small diameter portion at an upper end of the projected portion.

DETAILED DESCRIPTION OF THE PREFERRED EMBODIMENTS

A detailed explanation will be given of an example of embodiments of the invention in reference to the drawings as follows.

Figure 1:
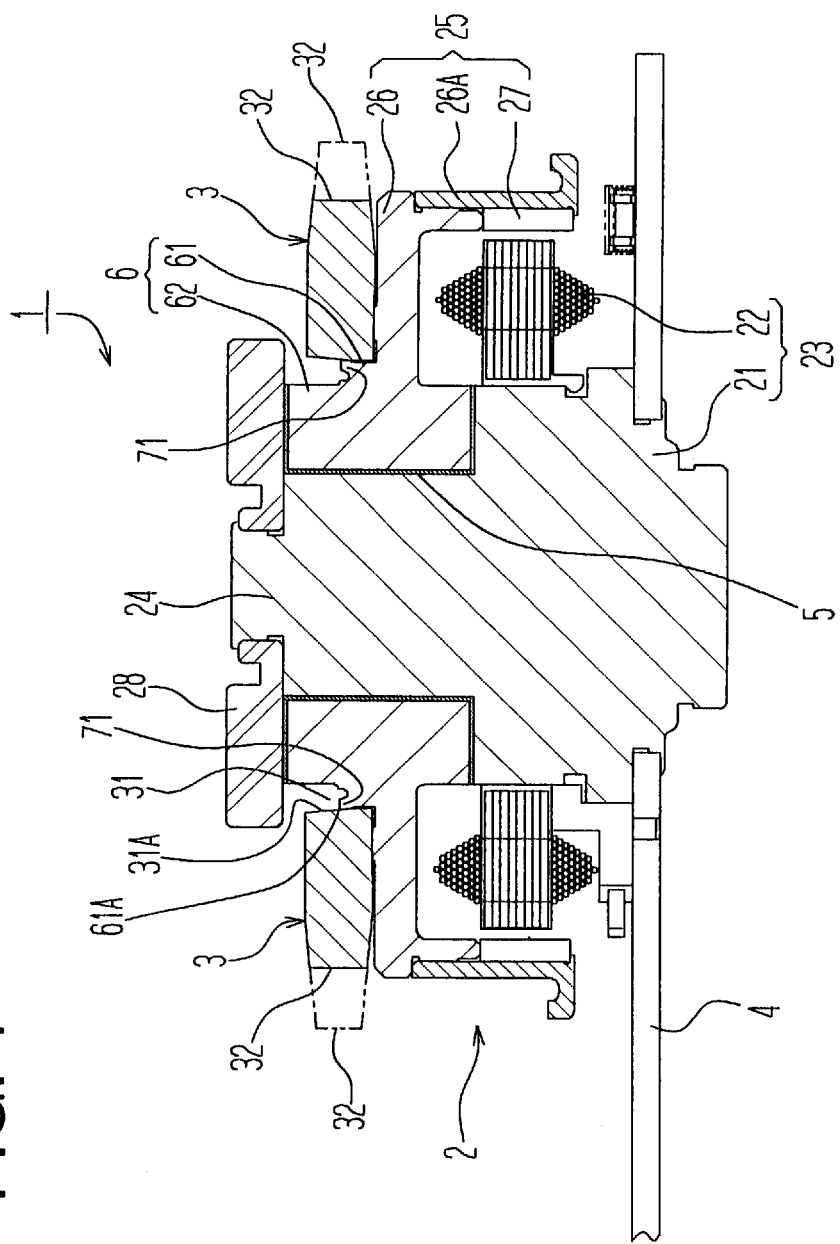
FIG. 1 is a vertical sectional view showing an example of embodiments of a polygon scanner motor according to the invention.
Figure 2:
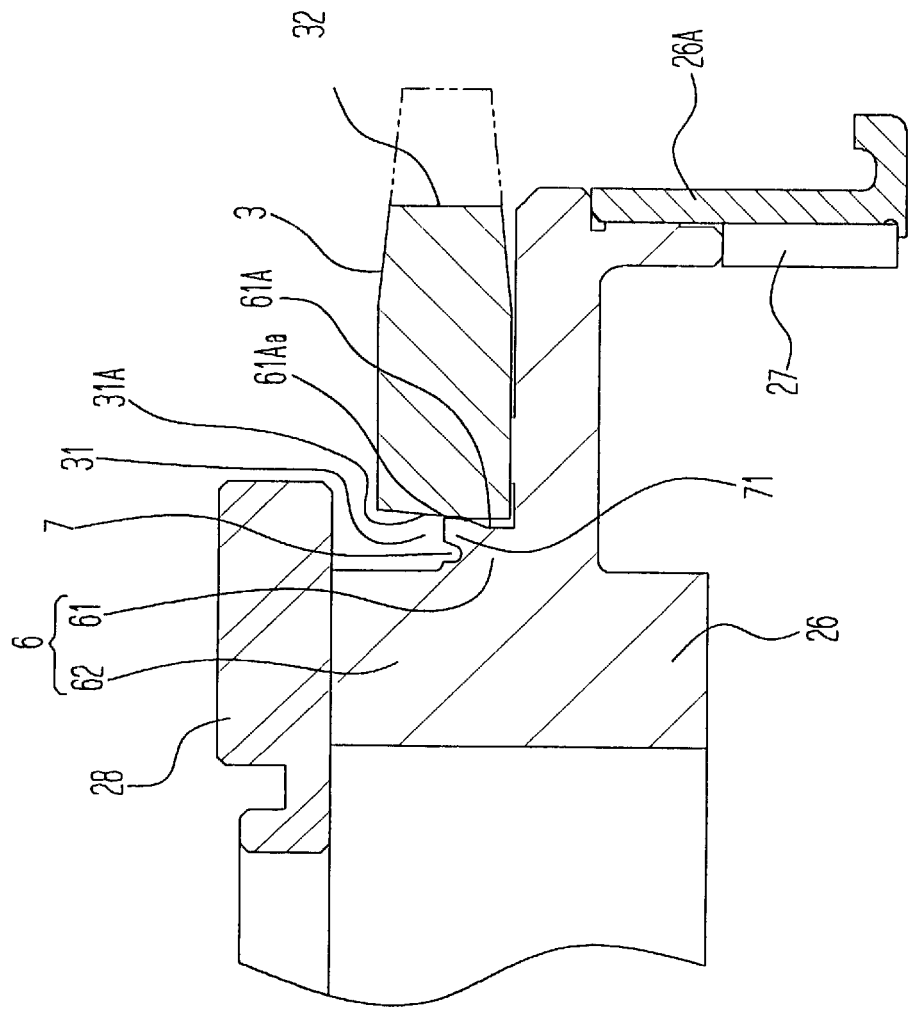
FIG. 2 is an essential portion enlarging sectional view for enlarging to show essential portions of the polygon scanner motor shown in FIG. 1.

FIG. 1 is a vertical sectional view showing an example of embodiments of a polygon scanner motor according to the invention, FIG. 2 is an essential portion enlarging sectional view for enlarging to show essential portions thereof and according to the embodiment, there is shown an example of a polygon scanner motor used for a laser beam printer.

In reference to FIG. 1 and FIG. 2, a polygon scanner motor 1 is constituted to drive to rotate a polygon mirror 3 by a direct current motor 2 of a brushless type and the direct current motor 2 is fixed to a base member 4.

The direct current motor 2 is constituted to provide a stator portion 23 constituted by fixedly adhering a winding coil 22 to a stator 21 fixed to the base member 4 by pertinent means and a rotor portion 25 axially supported rotatably by a shaft portion 24 integrally formed to the stator 21 via an air-dynamic bearing 5.

The rotor portion 25 is constituted by fixing a magnet 27 in a ring-like shape to an inner side of a skirt portion 26A comprising a magnetic material fixed to an outer periphery of a rotor 26 and is constituted such that the rotor 26 is rotated by force operated between a magnetic field by drive current which is made to flow in the winding coil 22 and a magnetic field by a magnet 27. In this case, notation 28 designates a thrust plate which becomes a constituent element of the air-dynamic bearing 5.

The polygon mirror 3 is a hexagonal portion in a shape of a thin plate comprising aluminum and a central portion thereof is formed with an attaching hole 31 in a circular shape. Further, at a side face of the polygon mirror 3, there is formed reflecting faces 32 each having a mirror face accuracy of submicron order for reflecting laser beam.

The rotor 26 is integrally formed with a projected portion 6 in a ring-like shape fitted to the attaching hole 31 for fixing the polygon mirror 3 to the rotor 26 by using the attaching hole 31. According to the embodiment, there are coaxially formed a large diameter portion 61 having an outer diameter dimension substantially in correspondence with the attaching hole 31 and a small diameter portion 62 integrally continuous to the large diameter portion 61 and an outer peripheral face of the large diameter portion 61 constitutes a fitting face 61A for fitting to the attaching hole 31. That is, the small diameter portion 62 is formed by providing a stepped recess portion in a ring-like shape at the outer peripheral face of the large diameter portion 61.

The small diameter portion 62 is provided to enable a fitting face end edge 61Aa of a fitting face 61A to be opposed to a vicinity of a center in an axial line direction of an inner peripheral face 31A of the attaching hole 31, when the polygon mirror 3 is fitted to the rotor 26 to constitute a predetermined attaching state shown in FIG. 1.

Further, the large diameter portion 61 is formed with a plurality of plastically deformed portions 71 constituted by pressing the inner peripheral face 31A of the attaching hole 31 to an outer side in the diameter direction at a plurality of locations along the fitting face end edge 61Aa for bonding the polygon mirror 3 and the projected portion 6. In this case, both of the polygon mirror 3 and the rotor 26 are made of aluminum. Therefore, the linear expansion coefficients of the both members are equal to each other and therefore, a state of bonding the both members is not changed by a change in temperature. Further, there may be constructed a constitution in which the polygon mirror 3 and the rotor 26 are made of pertinent metal materials having substantially equal linear expansion coefficient, thereby, the state of bonding the both members is not changed by a change in temperature.

Figure 3:
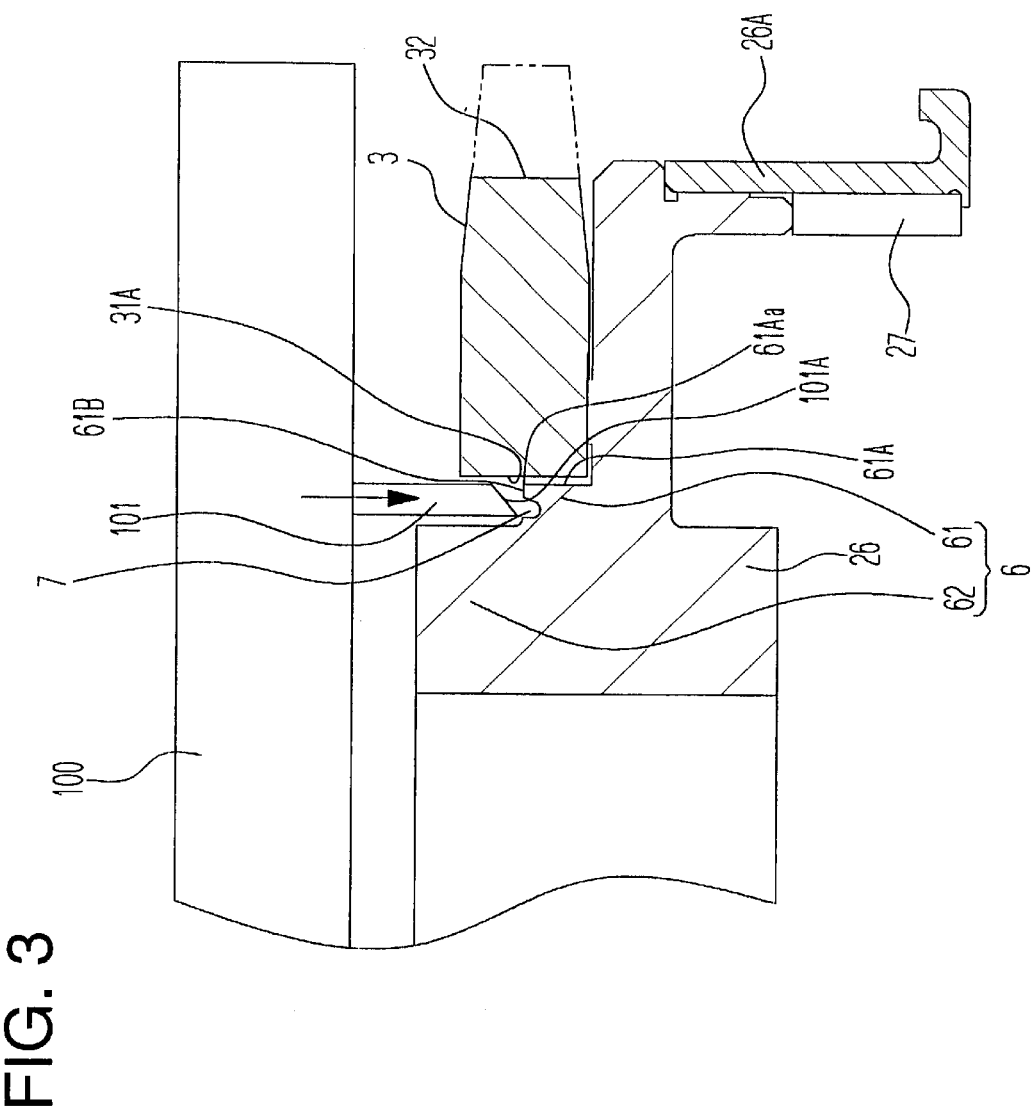
FIG. 3 is an explanatory view for explaining a calk bonding step at a plastically deformed portion shown in FIG. 1.

According to the embodiment, as shown by FIG. 3, the plastically deformed portion 71 can be produced by pressing a front end portion 101 of a calking jig 100 into a recess portion 7 previously provided at an upper face 61B of the large diameter portion 61 from above and deforming a corresponding peripheral edge portion of the recess portion 7 to a side of the polygon mirror 3 by a taper face 101A of the front end portion 101.

Figure 4:
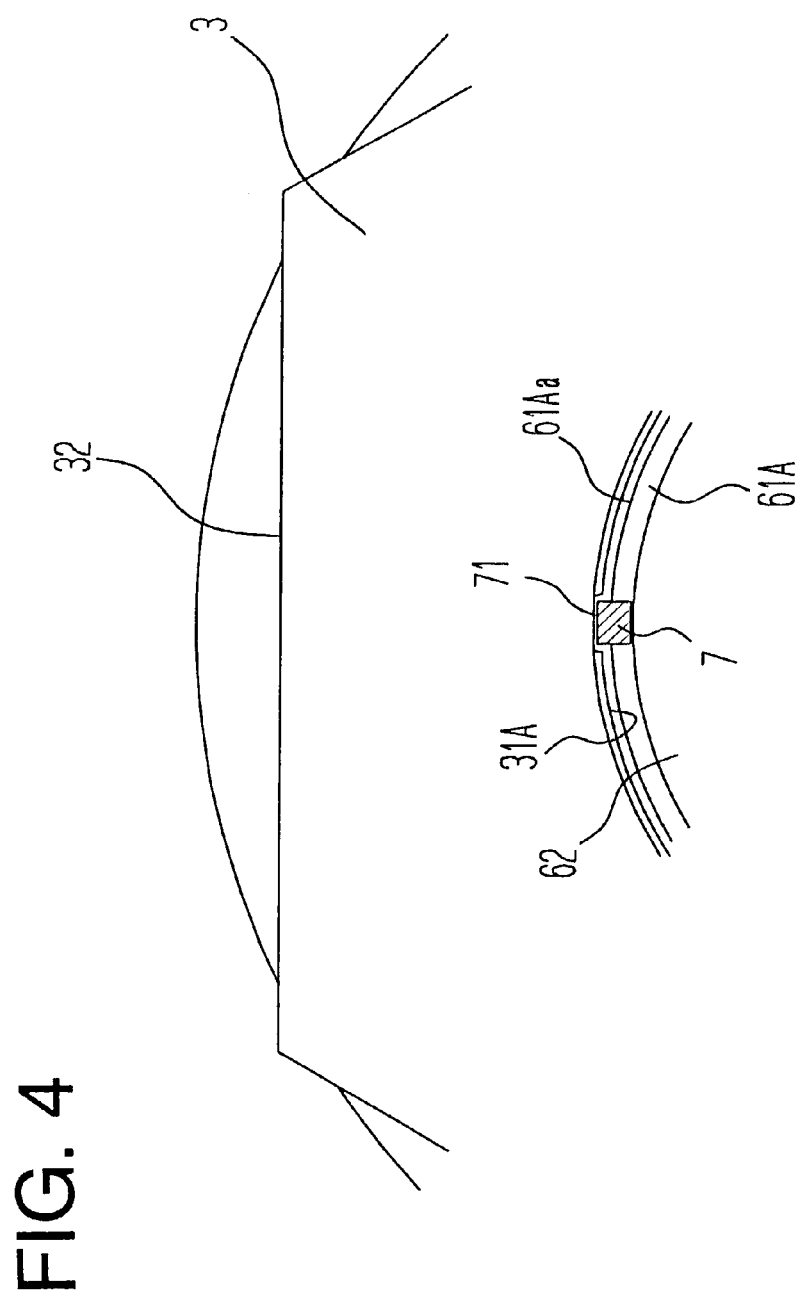
FIG. 4 is an enlarged detail view for enlarging to show a state in which a polygon mirror shown in FIG. 1 is bonded to a projected portion in a ring-like shape by calking by a plastically deformed portion in details.

FIG. 4 shows, in details, to enlarge a state in which the polygon mirror 3 is bonded to the projected portion 6 in the ring-like shape by calking by the plastically deformed portion 71. According to the method, when calking operation is carried out by using the calking jig, the front end portion 101 of the calking jig is firmly brought into the predetermined recess portion 7 to thereby enable to form the predetermined plastically deformed portion 71 at a predetermined portion and accordingly, high quality bonding can be carried out.

Further, although in FIG. 3, there is shown only a single one of the front end portion 101 of the calking jig 100, the calking jig 100 is provided with a plurality of the front end portions 101 to be able to be opposed to a plurality of the recess portions 7 previously provided at the large diameter portion 61 at equal angular intervals simultaneously and the above-described calking operation can be carried out by simultaneously pressing the plurality of front end portions 101 into the corresponding recess portions 7. Thereby, there are simultaneously formed the plurality of plastically deformed portions 71 for bonding, which are formed along the fitting face end edge 61Aa and the polygon mirrors 3 can be bonded to the projected portion 6 coaxially with the large diameter portion 61.

Figure 5:
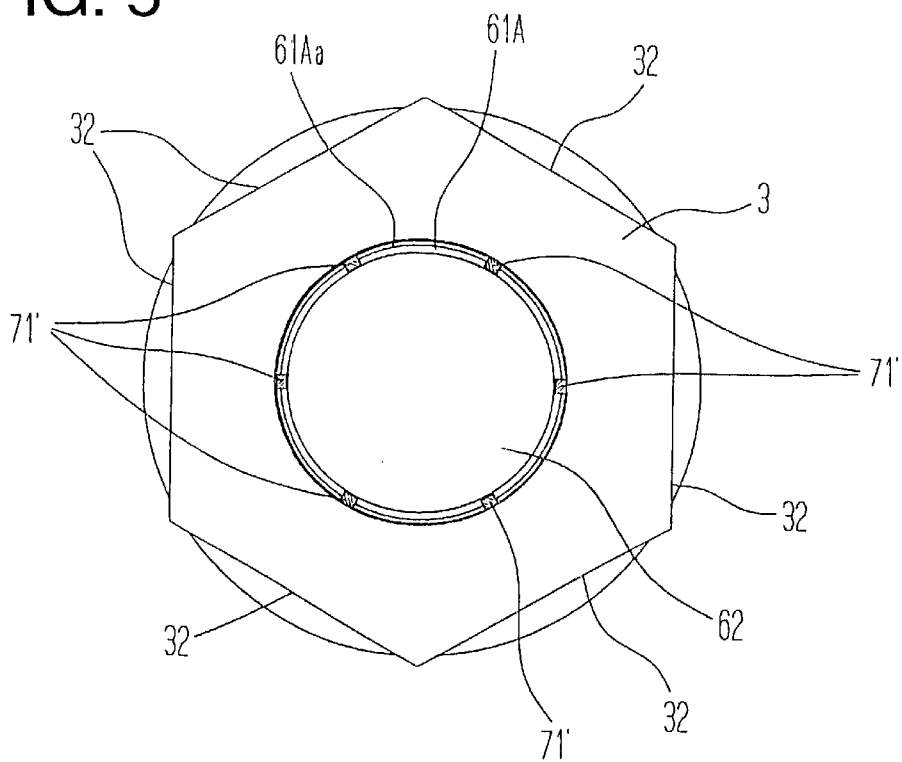
FIG. 5 is a plane view showing calk-bonded portions shown in FIG. 1.

As shown by FIG. 5, according to the embodiment, six of the plastically deformed portions 71 are provided at equal angular intervals along the fitting face end edge 61Aa, however, the number of the plastically deformed portions 71 is not limited to six but the number can be a pertinent arbitrary number regardless of the number of angles of the polygon mirror 3.

Figure 6:
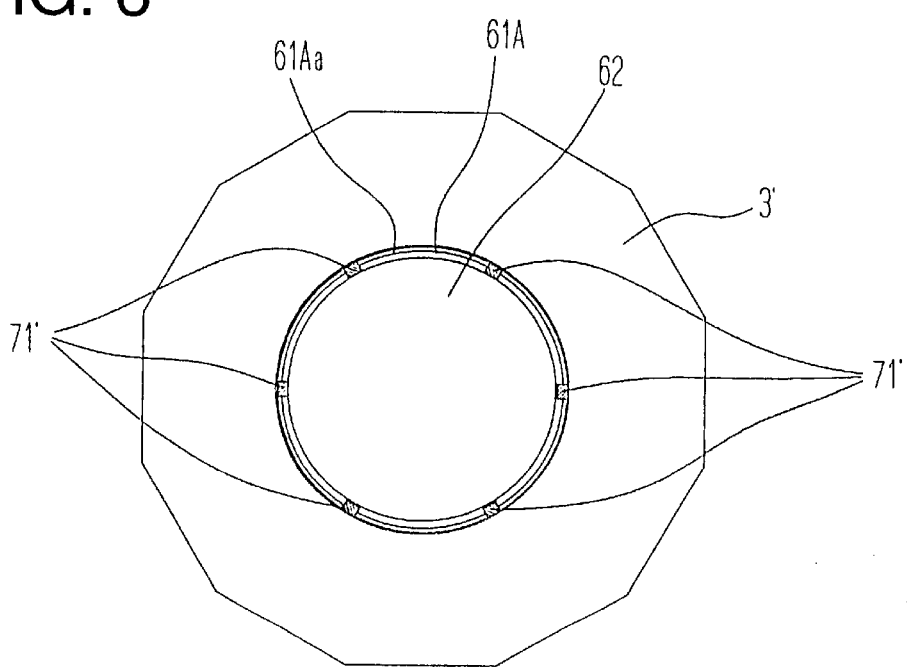
FIG. 6 is a plane view showing an embodiment according to the invention when a polygon mirror in a dodecagonal shape is used.

For example, as shown by FIG. 6 in the case of a polygon mirror 3' having a dodecagonal shape, the calking locations may be disposed at six locations by providing six of plastically deformed portions 71'.

Further, although according to the embodiments shown by FIG. 5 and FIG. 6, in both of the embodiments, the calking portions are set to positions in correspondence with centers of the respective reflecting faces of the polygon mirror, the calking portions may correspond to respective boundary portions of the respective reflecting faces or can be disposed at other pertinent arbitrary positions.

The reason is that according to the calking method by the invention, the substantial center in the axial line direction of the inner peripheral face 31A of the attaching hole 31 of the polygon mirrors 3, are pressed toward the outer side in the diameter direction of the polygon mirror 3 by the plastically deformed portions 71 to thereby achieve bonding of the polygon mirror 3 and the projected portion 6 and accordingly, not only small calking force is sufficient but also strain caused at the reflecting face 32 having the mirror face accuracy of submicron order by calking, is small and accordingly, the necessity of particularly selecting a specific portion for reducing the strain caused at the reflective face 32, is low.

According to the invention, as described above, bonding between the polygon mirror and the projected portion is achieved by pressing the substantial center in the axial line direction of the inner peripheral face of the attaching hole of the polygon mirror toward the outer side in the diameter direction of the polygon mirror by the plastically deformed portions and accordingly, not only small calking force is sufficient but also the strain caused at the reflecting face having the mirror face accuracy of submicron order by calking is small and therefore, it is not necessary to select a specific location to reduce the strain caused at the reflecting face.

As a result, it is not necessary to provide strain escaping grooves at the polygon mirror and accordingly, a reduction in cost can be achieved. Further, since it is not necessary to fabricate grooves at the polygon mirror, the mechanical strength of the polygon mirror may not be reduced, further, when the mechanical strength needs not to be high, thinning formation can be achieved.

Further, since the calking portions can arbitrarily be selected, calking can be carried out regardless of a number of faces of the polygon mirror and a reduction in a number of steps can be expected.

What is claimed is:

1. A method of connecting a polygon mirror to a rotor, comprising the steps of:
   providing a polygon mirror having around an outer periphery thereof a mirror surface for scanning light, and a setting hole having an inner periphery;
   providing a rotor having a projection having a plastically deformable edge portion;
   positioning the polygon mirror relative to the rotor so that the edge portion of the projection is disposed opposite a surface portion corresponding to an approximate center of the inner periphery of the setting hole in the axial direction of the inner periphery; and
   plastically deforming the edge portion of the projection against the surface portion of the inner periphery of the setting hole to thereby connect the polygon mirror to the rotor.

2. A method according to claim 1, wherein the projection of the rotor comprises a ring-shaped step portion having the deformable edge portion at an outer peripheral edge thereof.

3. A method according to claim 1, wherein the plastically deforming step comprises plastically deforming the edge portion of the projection at a plurality of locations at equal intervals along the inner periphery of the setting hole.

4. A method according to claim 1, wherein the projection of the rotor has a recess portion proximate the edge portion; and wherein the plastically deforming step includes the step of inserting a caulking jig in the recess portion and plastically deforming the edge portion of the projection using the caulking jig.

5. A method according to claim 1, wherein the polygon mirror and the rotor are formed of different metals having substantially the same coefficient of linear expansion to thereby prevent disconnection between the polygon mirror and the rotor due to variations in temperature.

6. A method according to claim 1, wherein the polygon mirror and the rotor are formed of a same metal to thereby prevent disconnection between the polygon mirror and the rotor due to variations in temperature.

7. A method according to claim 1, wherein the surface portion of the inner periphery of the setting hole is disposed at a position corresponding to an approximate center of the mirror surface of the polygon mirror.

8. A polygon scanner motor comprising:
   a polygon mirror having around an outer periphery thereof a mirror surface for scanning light, and a setting hole having an inner periphery and a surface portion corresponding to an approximate center of the inner periphery in an axial direction thereof; and
   a rotor having a projection having a plastically deformed edge portion bonded to the surface portion of the setting hole of the polygon mirror.

9. A polygon scanner motor according to claim 8; wherein the polygon mirror and the rotor are formed of different metals having substantially the same coefficient of linear expansion to thereby prevent disconnection between the edge portion of the projection of the rotor and the surface portion of the setting hole of the polygon mirror due to variations in temperature.

10. A polygon scanner motor according to claim 8; wherein the polygon mirror and the rotor are formed of a same metal to thereby prevent disconnection between the edge portion of the projection the rotor and the surface portion of the setting hole of the polygon mirror due to variations in temperature.

11. A polygon scanner motor according to claim 8; wherein the plastically deformed edge portion comprises a plurality of plastically deformed portions bonded to the surface portion of the setting hole along the inner periphery thereof.

12. A polygon scanner motor according to claim 11; wherein the plastically deformed portions are bonded to the surface portion of the setting hole at equal intervals along the inner periphery thereof.

13. A polygon scanner according to claim 11; wherein the mirror surf ace comprises a plurality of mirror surfaces disposed around the outer periphery of the polygon mirror; and wherein each of the plastically deformed portions of the projection is disposed at a position corresponding to an approximate center of a respective one of the mirror surf aces of the polygon mirror.

14. A polygon scanner according to claim 8; wherein the projection of the rotor has a first portion having a first diameter and a second portion having a second diameter greater than the first diameter, and wherein the edge portion of the projection extends from the first portion.

* * * * *